US012790276B2

(12) United States Patent
Lu et al.

(10) Patent No.: US 12,790,276 B2
(45) Date of Patent: Nov. 10, 2026

(54) LOW MELTING-POINT POROUS CERAMIC MATERIAL AND METHOD THEREOF

(71) Applicant: HUAQIAO UNIVERSITY, Quanzhou (CN)

(72) Inventors: Jing Lu, Quanzhou (CN); Yanhui Wang, Quanzhou (CN); Zhongqiang Ma, Quanzhou (CN)

(73) Assignee: HUAQIA UNIVERSITY, Quanzhou (CN)

( * ) Notice: Subject to any disclaimer, the term of this patent is extended or adjusted under 35 U.S.C. 154(b) by 599 days.

(21) Appl. No.: 18/208,822

(22) Filed: Jun. 12, 2023

(65) Prior Publication Data

US 2023/0322626 A1 Oct. 12, 2023

Related U.S. Application Data

(63) Continuation of application No. PCT/CN2021/100348, filed on Jun. 16, 2021.

(30) Foreign Application Priority Data

Dec. 28, 2020 (CN) ........................ 202011586853.X

(51) Int. Cl.
*C04B 35/14* (2006.01)
*C04B 35/626* (2006.01)
(Continued)

(52) U.S. Cl.
CPC .......... *C04B 35/14* (2013.01); *C04B 35/6261* (2013.01); *C04B 35/62655* (2013.01); *C04B 35/636* (2013.01); *C04B 35/64* (2013.01); *C04B 35/653* (2013.01); *C04B 38/0645* (2013.01); *C04B 2235/3203* (2013.01); *C04B 2235/3244* (2013.01); *C04B 2235/3418* (2013.01); *C04B 2235/349* (2013.01); *C04B 2235/365* (2013.01); *C04B 2235/604* (2013.01);
(Continued)

(58) Field of Classification Search
None
See application file for complete search history.

(56) References Cited

U.S. PATENT DOCUMENTS

2010/0113244 A1 5/2010 Chi et al.

FOREIGN PATENT DOCUMENTS

| | | |
|---|---|---|
| CN | 1032929 A | 5/1989 |
| CN | 103351165 A | 10/2013 |

(Continued)

OTHER PUBLICATIONS

CN 104030660 machine translation, Deng et al. Preparation of Heat-Resistant Purple Sand Cordierite Ceramic, Sep. 2014 (Year: 2014).*

(Continued)

*Primary Examiner* — Queenie S Dehghan
(74) *Attorney, Agent, or Firm* — COOPER LEGAL GROUP LLC

(57) ABSTRACT

A low melting-point porous ceramic material, a sintering temperature of the low melting-point porous ceramic material is 680-830° C., a porosity of the low melting-point porous ceramic material is 24-42%, raw materials of the low melting-point porous ceramic material comprise a binder (i.e., a temporary binder) and powder of raw materials.

7 Claims, 1 Drawing Sheet

(51) Int. Cl.

| | |
|---|---|
| ***C04B 35/636*** | (2006.01) |
| ***C04B 35/64*** | (2006.01) |
| ***C04B 35/653*** | (2006.01) |
| ***C04B 38/06*** | (2006.01) |

(52) U.S. Cl.

CPC *C04B 2235/606* (2013.01); *C04B 2235/6562* (2013.01); *C04B 2235/6567* (2013.01); *C04B 2235/9607* (2013.01)

(56) References Cited

FOREIGN PATENT DOCUMENTS

| | | | | | |
|---|---|---|---|---|---|
| CN | 104030660 | A | | 9/2014 | |
| CN | 104692667 | A | | 6/2015 | |
| CN | 105906311 | A | | 8/2016 | |
| CN | 106866175 | A | | 6/2017 | |
| CN | 107001149 | A | | 8/2017 | |
| CN | 110575707 | A | | 12/2019 | |
| CN | 112521177 | A | | 3/2021 | |
| KR | 20110006390 | A | | 1/2011 | |
| KR | 101431001 | B1 | * | 8/2014 | .............. H01J 11/38 |

OTHER PUBLICATIONS

CN 112679202 machine translation, Zhao et al., A Porous Ceramic Composition and Preparation method, Apr. 2021 (Year: 2021).*

CN110510990 machine translation, Wang et al., Functional Violet-Sand Filter Core Ceramic, Nov. 2019 (Year: 2019).*

CN 107352959 machine translation, Zhong, A High Temperature and Good Health of Ceramic and Preparation Method, Nov. 2017 (Year: 2017).*

Corresponding International Patent Application No. PCT/CN2021/100348, International Search Report, date mailed Sep. 28, 2021.

Corresponding International Patent Application No. PCT/CN2021/100348, Written Opinion, date mailed Sep. 28, 2021.

Corresponding Chinese Patent Application No. 202011586853.X, First Office Action dated Mar. 2, 2022.

Corresponding Chinese Patent Application No. 202011586853.X, Notice of Grant of Patent dated Apr. 26, 2022.

Sha, et al., "Thermal Stability of polycrystalline diamond compact sintered with boroncoated diamond particles", Diamond and Related Materials, Feb. 11, 2020, vol. 104, pp. 1-11.

* cited by examiner

LOW MELTING-POINT POROUS CERAMIC MATERIAL AND METHOD THEREOF

RELATED APPLICATIONS

This application a continuation of International patent application PCT/CN2021/100348, filed on Jun. 16, 2021, which claims priority to Chinese patent application 202011586853.X, filed on Dec. 28, 2020. International patent application PCT/CN2021/100348 and Chinese patent application 202011586853.X are incorporated herein by reference.

FIELD OF THE DISCLOSURE

The present disclosure relates to the technical field of ceramic materials, and in particular relates to a low melting-point porous ceramic material and a method thereof.

BACKGROUND OF THE DISCLOSURE

Porous ceramic materials have characteristics of a large specific surface area, energy absorption, damping performance, etc. Specially processed porous ceramic materials have selective permeability to liquid, gas, and other substances to be widely used in various fields, such as vehicle exhaust treatment, chemical industry, machinery fields, and biomedical fields. At present, commercial porous ceramic materials mainly use $Al_2O_3$, SiC, $ZrO_2$, and mullite as main raw materials. However, pore forming difficulties are caused due to these materials having a complex manufacturing process, a high sintering temperature, high energy consumption, high cost, or fire resistance mismatch between a pore forming agent and of a substrate. Therefore, the existing porous ceramic products have problems such as low mechanical strength, poor seismic resistance, poor damping performance, and have difficulty producing ideal through holes, resulting in a popularization and application of the existing porous ceramic products being severely limited. Therefore, suitable raw materials need to be found to effectively reduce the sintering temperature and to increase the porosity and the specific surface area of the porous ceramic materials, so as to promote wide application of the porous ceramic materials.

BRIEF SUMMARY OF THE DISCLOSURE

An objective of the present disclosure is to provide a low melting-point porous ceramic material to overcome the deficiencies of the existing techniques.

Another object of the present disclosure is to provide a method for preparing the low melting-point porous ceramic material.

A technical solution of the present disclosure is as follows:

A low melting-point porous ceramic material, a sintering temperature of the low melting-point porous ceramic material is 680-830° C., a porosity of the low melting-point porous ceramic material is 24-42%, raw materials of the low melting-point porous ceramic material comprise a binder (i.e., a temporary binder) and powder of raw materials, the powder of raw materials has a composition of components by weight as follows:

27.5-50% of borate-glass sand,
15-20% of purple clay powder,
20-50% of quartz powder,
6-12% of $Na_2O$ powder, 1-2% of $ZrO_2$ powder, and
0.5-1.5% of $Li_2O$ powder, and
the powder of raw materials is prepared by mixing components of the composition, vitrifying, wet grinding, drying, and sieving.

In a preferred embodiment of the present disclosure, the binder is dextrin.

In a preferred embodiment of the present disclosure, the borate-glass sand and the $Na_2O$ powder pass through a 2000-mesh sieve.

In a preferred embodiment of the present disclosure, the purple clay powder, the quartz powder, and the $LiO_2$ powder pass through a 1000-mesh sieve.

In a preferred embodiment of the present disclosure, a weight ratio of the powder of raw materials and the binder is 80-90:10-20.

In a preferred embodiment of the present disclosure, a weight ratio of the powder of raw material and the binder is 85:15.

In a preferred embodiment of the present disclosure, the powder of raw materials passes through a 5000-mesh sieve.

A method for preparing the low melting-point porous ceramic material, comprising:

(1) weighing the components of the composition according to the weights of the components;
(2) mixing the borate-glass sand and the $Na_2O$ powder to even, then dry grinding and sieving successively to obtain a first mixture;
(3) mixing the purple clay powder, the quartz powder, and the $Li_2O$ powder to even, then dry grinding, and sieving successively to obtain a second mixture;
(4) mixing the first mixture and the second mixture, then vitrifying, wet grinding, drying, and sieving successively to obtain the powder of raw materials;
(5) mixing the powder of raw materials and the binder to even, and then granulating to obtain a mixed raw material;
(6) pressing the mixed raw material into a specified shape, and drying completely to obtain an unsintered body; and
(7) heating the unsintered body to the sintering temperature, and maintaining at the sintering temperature to obtain a sintered porous ceramic material.

In a preferred embodiment of the present disclosure, a temperature for the vitrifying is 800-900° C.

In a preferred embodiment of the present disclosure, a heating rate for the heating the unsintered body in the step 7 is 4-6° C. per minute, and a time for maintaining at the sintering temperature is 1.5-2.5 hours.

The present disclosure has the following advantages.

All of the raw materials in the present disclosure work synergistically, and the obtained product has advantages of a simple sintering process, a good mechanical strength, and generating pores without an addition of a pore forming agent, etc. The present disclosure effectively solves problems of fire resistance mismatch of the binder and the pore forming agent, poor heat dissipation performance, poor air permeability, etc., and a service life and holding power of the sintered porous ceramic material can be improved. A sintering temperature of the low melting-point porous ceramic material is only 680-780° C., a maximum porosity can reach 42% without the addition of the pore forming agent, and a good compressive strength, a good flexural strength, and a good hardness are maintained.

DETAILED DESCRIPTION OF THE EMBODIMENTS

The technical solution of the present disclosure will be further described below in combination with the accompanying embodiments and drawings.

Embodiments 1-6

(1) Components of a composition of powder of raw materials are weighted according to weight ratios of the components;

(2) Borate-glass sand and $Na_2O$ powder are mixed to even, dry ground, and sieved through a 2000-mesh sieve successively to obtain a first mixture;

(3) Purple clay powder, quartz powder, and $Li_2O$ powder are mixed to even, dry ground, and sieved through a 1000-mesh sieve successively to obtain a second mixture;

(4) The first mixture and the second mixture are mixed to even, successively vitrified at 800° C., wet ground, dried, and sieved through a 5000-mesh sieve to obtain the powder of raw materials;

(5) The powder of raw materials and dextrin are mixed and then granulated to obtain mixed raw materials, wherein a weight ratio of the powder of raw materials and the dextrin is 85:15;

(6) The mixed raw material is pressed into a desired shape and dried completely for 24 hours to obtain an unsintered body;

(7) The unsintered body is heated to a sintering temperature with a heating rate of 5° C. per minute and maintained at the sintering temperature for 2 hours to obtain a sintered porous ceramic material.

Figure 1:
FIG. 1 is an electron microscopic image of a porous structure of a sintered low melting-point porous ceramic material in Embodiment 1 of the present disclosure.

The weight ratios of the one or more components of the raw materials, the sintering temperature, and obtained technical effects in Embodiments 1-6 are shown in Table 1. A porous structure of the sintered low melting-point porous ceramic material obtained in Embodiment 1 are shown in FIG. 1.

Comparison Embodiments 1-5

A specific manufacturing process of Comparison embodiments 1-5 is the same as the manufacturing process of Embodiments 1-6. Weight ratios of one or more components of raw materials, a sintering temperature, and obtained technical effects of Comparison embodiments 1-5 are shown in Table 1.

TABLE 1

A comparison list of Embodiments 1-6 and Comparison embodiments 1-5

| | Embodiment | | | | | | Comparison embodiment | | | | |
|---|---|---|---|---|---|---|---|---|---|---|---|
| | 1 | 2 | 3 | 4 | 5 | 6 | 1 | 2 | 3 | 4 | 5 |
| Borate-glass sand (wt %) | 27.5 | 27.5 | 27.5 | 27.5 | 35 | 50 | 27.5 | 27.5 | 25 | 18.5 | 55 |
| Purple clay powder (wt %) | 15 | 17.5 | 20 | 17.5 | 17.5 | 17.5 | 12.5 | 22.5 | 17.5 | 17.5 | 17.5 |
| Quartz powder (wt %) | 45 | 42.5 | 40 | 50 | 35 | 20 | 47.5 | 37.5 | 47.5 | 51.5 | 15 |
| $Na_2O$ powder (wt %) | 10 | 10 | 10 | 10 | 10 | 10 | 10 | 10 | 10 | 10 | 10 |
| $ZrO_2$ powder (wt %) | 1.5 | 1.5 | 1.5 | 1.5 | 1.5 | 1.5 | 1.5 | 1.5 | 1.5 | 1.5 | 1.5 |
| $Li_2O$ powder (wt %) | 1 | 1 | 1 | 1 | 1 | 1 | 1 | 1 | 1 | 1 | 1 |
| Sintering temperature (° C.) | 750 | 750 | 750 | 830 | 730 | 680 | 750 | 750 | 850 | 1100 | 680 |
| Porosity (%) | 24.2 | 35.7 | 41.2 | 34.3 | 33.2 | 35.1 | 10.2 | 50.6 | 34.7 | 35.4 | 34.6 |
| Compressive strength (Mpa) | 41.5 | 37.9 | 34.6 | 36.4 | 35.1 | 35.2 | 46.7 | 22.5 | 34.2 | 32.5 | 34.4 |
| flexural strength (Mpa) | 39.5 | 35.7 | 30.3 | 34.7 | 33.4 | 35.4 | 47.4 | 18.3 | 32.5 | 33.3 | 34.3 |
| Hardness (HRB) | 33.54 | 28.32 | 25.21 | 27.9 | 26.1 | 27.2 | 38.4 | 20.4 | 24.31 | 27.4 | 28.46 |

It can be seen from Table 1 that when an amount of the purple clay powder is less than 15%, pores of a sintered porous ceramic material change from through pores to closed pores, resulting in the porosity of the sintered porous ceramic material decreasing rapidly and not reflecting advantages of porous ceramics. When the amount of the purple clay powder is higher than 20%, the pores of the sintered porous ceramic material quickly overlap to become larger, causing the porosity of the sintered porous ceramic material to rapidly increase and mechanical properties of the sintered porous ceramic material to rapidly decrease. A strength of the sintered porous ceramic material is too low, resulting in an application range being greatly reduced and a service life rapidly decreasing.

When an amount of the borate-glass sand is less than 20%, the sintering temperature of the raw materials will reach 1100° C. The application range (such as ceramic grinding tools) will be narrowed due to the sintering temperature being too high, and morphology of abrasive particles of the sintered porous ceramic material will be damaged by excessively high sintering temperature (see Sha X, Yue W, Zhang H, et al. Thermal stability of polycrystalline diamond compact separated with born-loaded diamond particles [J]. Diamond and Related Materials. 2020, 104: 107753). When the amount of borate-glass sand is more than 55%, the sintering temperature of the raw materials still needs to be 680° C. and does not decrease following an increased content of the borate-glass sand. A temporary binder (i.e., a binder) used in a ceramic binder prepared by the present disclosure is the dextrin. Conventional temporary binders on the market, such as water glass, will react with the ceramic binder when mixing or produce pores after sintering, causing inherent pores of the purple clay powder to be destroyed and the ceramic binder to become dense.

Comparison Embodiment 6

Figure 2:
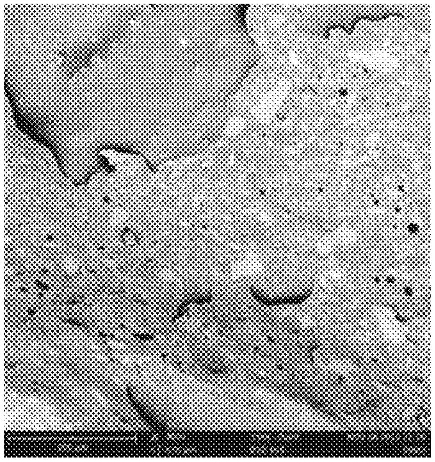
FIG. 2 is an electron microscopic image of a porous structure of the sintered low melting-point porous ceramic material in Comparison embodiment 6 of the present disclosure.

This embodiment differs from Embodiment 1 in that the powder of raw materials and a water glass solution (as a binder instead of dextrin, a weight ratio of water and the water glass is 13.6:1) are mixed to even and then granulated to obtain the mixed raw material, wherein a weight ratio of the powder of raw materials and the water glass solution is 85:15. The mixed raw material is pressed into the desired shape and dried completely for 24 hours to obtain the unsintered body; the unsintered body is heated to 750° C. with the heating rate of 5° C. per minute and maintained at 750° C. for 2 hours to obtain sintered porous ceramics as shown in FIG. 2. Compared with Embodiment 1, a ceramic body of the sintered porous ceramics prepared by this comparison embodiment became dense, and advantages of a natural porous structure brought by the purple clay powder cease, causing mechanical performances of the sintered porous ceramics to be improved. A compressive strength of the sintered porous ceramics is 55.4 MPa, a flexural strength of the sintered porous ceramics is 50.25 MPa, and a hardness of the sintered porous ceramics is 40 HRB.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A method for preparing a low melting-point porous ceramic material, comprising:

(1) weighing components of a composition according to weights of the components as follows:
 27.5-50% of borate-glass sand,
 15-20% of purple clay powder,
 20-50% of quartz powder,
 6-12% of $Na_2O$ powder,
 1-2% of $ZrO_2$ powder, and
 0.5-1.5% of $Li_2O$ powder;

(2) mixing the borate-glass sand and the $Na_2O$ powder, then dry grinding and sieving successively to obtain a first mixture;

(3) mixing the purple clay powder, the quartz powder, the $ZrO_2$ powder, and the $Li_2O$ powder, then dry grinding, and sieving successively to obtain a second mixture;

(4) mixing the first mixture and the second mixture, then vitrifying, wet grinding, drying, and sieving successively to obtain a powder of raw materials;

(5) mixing the powder of raw materials and a binder, and then granulating to obtain a mixed raw material;

(6) pressing the mixed raw material into a specified shape, and drying completely to obtain an unsintered body; and (7) heating the unsintered body to a sintering temperature, and maintaining at the sintering temperature to obtain a sintered porous ceramic material, wherein:
 the sintering temperature is 680-830° C., and
 a porosity of the low melting-point porous ceramic material is 24-42%.

2. The method according to claim 1, wherein a temperature for the vitrifying is 800-900° C.

3. The method according to claim 2, wherein the purple clay powder, the quartz powder, the $ZrO_2$ powder, and the $Li_2O$ powder pass through a 1000-mesh sieve.

4. The method according to claim 1, wherein a heating rate for the heating the unsintered body in the step 7 is 4-6° C. per minute, and a time for maintaining at the sintering temperature is 1.5-2.5 hours.

5. The method according to claim 1, wherein the binder is dextrin.

6. The method according to claim 1, wherein the borate-glass sand and the $Na_2O$ powder pass through a 2000-mesh sieve.

7. The method according to claim 1, wherein a weight ratio of the powder of raw materials and the binder is 80-90:10-20.

* * * * *